United States Patent
Debrody et al.

(10) Patent No.: US 8,991,879 B2
(45) Date of Patent: Mar. 31, 2015

(54) TAMPER EVIDENT BOLT SECURITY SEAL

(71) Applicant: E J Brooks Company, Congers, NY (US)

(72) Inventors: Robert Debrody, Wayne, NJ (US); George Lundberg, Pompton Plains, NJ (US); Richard Dreisbach, Lafayette, NJ (US); Andrew Bonczyk, White Plains, NY (US)

(73) Assignee: EJ Brooks Company, Congers, NY (US)

( * ) Notice: Subject to any disclaimer, the term of this patent is extended or adjusted under 35 U.S.C. 154(b) by 256 days.

(21) Appl. No.: 13/785,062

(22) Filed: Mar. 5, 2013

(65) Prior Publication Data

US 2013/0259598 A1    Oct. 3, 2013

Related U.S. Application Data

(60) Provisional application No. 61/615,924, filed on Mar. 27, 2012.

(51) Int. Cl.
 *E05B 39/02* (2006.01)
 *F16B 19/00* (2006.01)
 *G09F 3/03* (2006.01)

(52) U.S. Cl.
 CPC ............. *F16B 19/00* (2013.01); *G09F 3/0317* (2013.01)
 USPC .......................................... 292/327; 292/317

(58) Field of Classification Search
 USPC ........... 292/237, 317, 324, 325, 397 A, 307 B
 See application file for complete search history.

(56) References Cited

U.S. PATENT DOCUMENTS

| | | | |
|---|---|---|---|
| 393,688 A | 11/1888 | Brooks | |
| 2,178,160 A | * 10/1939 | Berry | ............................ 411/271 |

(Continued)

FOREIGN PATENT DOCUMENTS

| | | |
|---|---|---|
| WO | 0205613 A2 | 1/2002 |
| WO | 2006018574 A2 | 2/2006 |
| WO | 2010099819 A1 | 9/2010 |

OTHER PUBLICATIONS www.abric.com/product/view/item/18:UnoLock%202.0, UniLock 2.0, 2010.

(Continued)

*Primary Examiner* — Mark Williams
(74) *Attorney, Agent, or Firm* — William Squire

(57) ABSTRACT

A tamper evident security seal includes a locking unit and a bolt with a groove at its shank locking portion, the groove for receiving a resilient locking ring attached to a lock body in a locking unit receiving the bolt in a locked state. The locking unit includes two housing portions one of which has a top wall, a bottom wall and a first upstanding segment of a circular cylinder side wall interconnected thereto may be of any color. The top wall has an aperture for receiving the bolt therethrough. A mating second housing portion has a second segment of a circular cylinder side wall, preferably white having ID indicia thereon, forms a circular cylindrical housing with the first housing portion and is captured between the top and bottom walls. A lock body first element is plastic and molded one piece with the second housing portion. A lock body second steel element mates with the first element forming a lock body with an annular channel in which the ring is positioned. The channel and ring generally form a conventional bolt locking arrangement. A plastic transparent cover, enclosing the two housing portions, is bonded to the bottom wall. A collar on the top wall has two slots for receiving mating anti-spin tabs on the bolt shank.

14 Claims, 8 Drawing Sheets

(56) References Cited

U.S. PATENT DOCUMENTS

| | | | |
|---|---|---|---|
| 4,286,640 A * | 9/1981 | Knox et al. | 604/404 |
| 4,802,699 A | 2/1989 | Smith | |
| 5,005,883 A | 4/1991 | Guiler | |
| 5,732,989 A * | 3/1998 | Stevenson et al. | 292/327 |
| 5,775,747 A * | 7/1998 | Navarsky | 292/307 B |
| 7,178,841 B1 * | 2/2007 | Moreno | 292/327 |
| 7,226,095 B2 | 6/2007 | Huang | |
| D548,041 S | 8/2007 | Littrell et al. | |
| 7,438,334 B2 | 10/2008 | Terry et al. | |
| 7,721,407 B2 | 5/2010 | Littrell et al. | |
| 2006/0261607 A1 | 11/2006 | Kromkowski et al. | |
| 2007/0007776 A1 | 1/2007 | Beard et al. | |
| 2007/0024066 A1 | 2/2007 | Terry et al. | |
| 2009/0026773 A1 * | 1/2009 | Terry et al. | 292/327 |
| 2009/0091144 A1 * | 4/2009 | Debrody et al. | 292/327 |
| 2009/0267362 A1 | 10/2009 | Remark et al. | |
| 2009/0320541 A1 * | 12/2009 | Stone | 70/440 |
| 2013/0277989 A1 * | 10/2013 | Nazzari | 292/327 |

OTHER PUBLICATIONS www.universealgroup.com/page/geninfo_b.htm; Bolt Seals.
www.megafortris.com, Mega Bolt Lock.
www.abric.com UnoLock.
www.xfseal.com/bolt_seal.htm; High Security Bolt Seals; TSS Shanghai Xinfam Container Fittings Co., Ltd.
www.universealgroup.com, Locktainer Intermodal High Security Seals.
Abric Security Seal, Unolock 2.0.
Search report and writ op, Apr. 24, 2013, E. J. Brooks Company.

* cited by examiner

TAMPER EVIDENT BOLT SECURITY SEAL

Priority is claimed on U.S. provisional application Ser. No. 61/594,418 filed Mar. 27, 2012 and incorporated herein by reference in its entirety.

The present invention relates to tamper evident bolt security seals. Tamper evident bolt security seals are in wide use on cargo containers doors, e.g., large steel boxes shipped by ship, train and truck. They are also used on the doors of rail road freight cars and trucks. Bolt seals protect the sealed goods typically during transit.

Such bolt security seals use a basic construction disclosed in commonly owned U.S. Pat. No. 4,802,700, incorporated by reference herein. Disclosed therein is a steel lock body having a blind bore in which a bolt shank locking portion is inserted, and having a conventional annular groove in its peripheral surface. The lock body has a conventional channel in communication with its bore. The channel has two regions of different diameters coupled by an inclined surface of the channel. The smaller diameter channel region is circular cylindrical. A resilient split metal ring, i.e., C-shaped, is located in the lock body channel. The ring has an inner diameter that is smaller than the outside diameter of the bolt shank which is typically circular cylindrical.

As the shank is inserted into the lock body bore, the shank engages the ring. The shank has an outer diameter about the same as the bore's inner diameter. The ring has a quiescent inside diameter smaller than the shank outer diameter. As the shank is inserted into the lock body bore, the ring expands into the channel's larger diameter portion. When the shank groove aligns with the channel, the ring automatically retracts toward its quiescent position engaged with the bolt groove. At this time part of the ring is in the channel and part is in the bolt groove.

When the bolt is displaced in the withdrawal direction, the ring inside the bolt groove is also displaced in the withdrawal direction. This results in the ring being displaced in alignment with the channel smaller diameter as the ring slides on the channel inclined surface. In this position, the ring is locked seated in the channel and in the bolt groove. This basic arrangement of lock body and bolt has been in wide use for many years.

Improvements to this arrangement have been made to such seals as disclosed by commonly owned U.S. Pat. Nos. 5,005,883 and 5,127,687, incorporated by reference herein. Bolt seals of other configurations are also known such as disclosed for example in commonly owned U.S. Pat. Nos. 393,688; 5,005,883; 5,347,689; 5,450,657; 5,582,447; 5,413,393; 5,732,989; and 7,721,407 among others.

U.S. Pat. No. 7,226,095 to Huang discloses a bolt seal having a cylindrical outer plastic casing over a molded an inner barrel. Bolt seals today are widely used with such a casing, but which casing as presently employed is also transparent. Pat. Application No. US 2006/0267362 discloses a bolt with a plurality of anti-rotational members to keep the bolt from being removed in an attempt to using a drill to spin the bolt free from the lock body. WO 02/056133 discloses similar structure. US Pat. Application No. 2007/0007776 discloses an anti-spin bolt seal with an inner locking device having a cover that is free to spin relative to the bolt and locking device inside the cover such that spinning of the bolt relative to the locking device is not possible in an attempt to free the bolt from the locking device.

U.S. Pat. No. 7,721,407 discloses a bolt type security seal that provides colored plastic elements to the seal to meet current desires of the industry to utilize colorized seals. Prior art seals tend to be all metal that have metallic finishes not colorized. Also disclosed is a lock body comprising multiple elements. US Published application No. 2009/0320541 discloses a lock body that has an overmold element.

Various manufacturers make bolt seals with clear covers with indicia thereon or on an element underneath and visible through the cover to provide further protection of the seal unique ID. These covers are also made with various colored plastic materials to meet industry requirements for colored bolt seals. For example, see the applicants' assignee d/b/a TydenBrooks' web site and the web sites of other manufacturers for such seals.

When a seal is tampered with, the owner first learns of the theft upon authorized opening of the seal, when it is too late to determine when, where and by whom during transit of the goods that the theft has occurred.

To solve this problem, tamper evidence has been added to such bolt seals. For example, bar codes or other unique identifying indicia is added to the seal and also electronics may be added for purposes of tracking and monitoring in transit seals.

Electronics add to the cost of an otherwise simple and low cost bolt and lock body arrangement, and thus not always desired in all situations. Such identifying indicia may be altered in a manner not readily detected during tampering of the seal. In an attempt to overcome this tampering problem, clear transparent covers are presently widely used to cover the lock body of the seal. The seal indicia is imprinted on the lock body beneath the cover so that any attempt at altering the indicia becomes readily evident. The covers typically are sonic welded or otherwise fastened in place. If the welds or bonds are removed in an undetectable manner, the covers may be removed and the seal locking body, due to its construction, may be broken into without leaving evidence of tampering.

The present inventors recognize the above problems with the prior art seals and a need for a bolt seal that provides low cost and a more effective tamper evident bolt seal than the prior art bolt seals, and providing the desired seal coloring. Evidence of tampering is important, as certain trusted persons may be tempted to steal valuables protected by such seals. If a person can break open the seal, take the forbidden property, and then reattach the seal without the seal having evidence that it has been broken into, then this presents a problem to the owner by making it more difficult or impossible to identify the person(s) responsible for the theft.

A tamper evident bolt security seal according to one embodiment of the present invention comprises a bolt including a shank having opposing ends, a head at one shank end and an annular locking groove in the shank surface at the other shank end forming a shank locking portion, and a locking unit to which the shank locking portion is secured. The locking unit comprises first and second mating housing portions forming a housing defining an inner chamber. The first housing portion includes a first peripheral side wall. The second housing portion includes a second peripheral side wall having top and bottom regions and top and bottom walls attached to the side wall at the respective top and bottom regions, the top wall having an aperture for receiving the shank therethrough.

The first peripheral side wall is captured between the top and bottom walls and cooperates with the mating second housing portion for forming the inner chamber. A lock body is secured to the first housing portion in the inner chamber and arranged for receiving the shank locking portion, the lock body having an annular locking channel adjacent to the received shank locking portion. A resilient element is in the annular locking channel cooperating with the shank annular locking groove for locking the received shank to the lock body.

A cover is arranged for the shank locking portion to pass therethrough for the locking and secured to the bottom wall, the cover and bottom wall for enclosing the first housing portion and the top and side wall of the second housing portion whereby the locked shank and lock body interlock the first and second housing portions thereto.

In a further embodiment, Identification indicia is on the outer surface of the first partial peripheral wall wherein at least a portion of the cover is sufficiently transparent for the indicia to be visible therethrough.

In a further embodiment, the lock body comprises two mating elements, one of said lock body elements comprising a first material and one piece with the first housing portion and the other lock body element comprises a second material different than the first material.

In a further embodiment, the first material is plastic and the second material is metal.

In a further embodiment, the first and second housing portion are different colors, are circular cylindrical segments forming a circular cylindrical housing and are visible through the cover.

In a further embodiment, the first and second housing portions are segments of a circular cylinder which combine to form a circular cylinder.

In a further embodiment, the cover is bonded to the bottom wall.

In a further embodiment, the shank includes at least one projection extending radially outwardly from the shank surface, the cover including a top wall and a collar attached to the cover top wall, the collar and top wall being arranged for permitting the shank to pass therethrough, the collar having a hollow portion for receiving the shank at least one projection for precluding rotation of the received locked shank relative to the locking unit.

In a further embodiment, included are reinforcing ribs attached to the collar and top wall for reinforcing the collar, the hollow portion comprising a slot.

In a further embodiment, the bottom wall has an outer ledge abutting the first housing portion, the cover abutting the ledge and being bonded thereto.

In a further embodiment, the second housing portion side wall has a rib in the inner chamber for supporting the lock body.

In a further embodiment, the lock body comprises two mating elements, one of said elements comprising a first material and molded one piece with the first housing portion and the other element comprises a second material different than the first material, the one element having a circular cylindrical recess of a given diameter forming a first portion of the channel and the other element having a recess in communication with the cylindrical recess and tapering from the given diameter to a smaller diameter wherein the recesses form an annular lock body channel.

In a still further embodiment, the one element is plastic and the other element is metal.

In a still further embodiment, the resilient element is a split C-shaped ring and the lock body channel is annular.

IN THE DRAWING

FIG. 12 is an elevation cross sectional view corresponding to the left hand housing portion of FIG. 4 taken along lines 12-12 of FIG. 4, and further including the second lock body portion of FIGS. 11 and 11a seated within the stepped shoulders of the first lock body and positioned inverted from its orientation of FIG. 11a;

Figure 1:
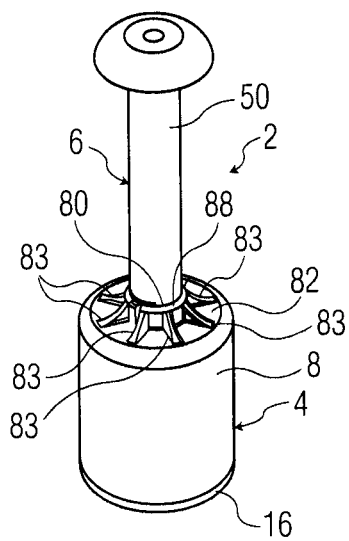
FIG. 1 is an isometric view of a bolt security seal according to one embodiment of the present invention.
Figure 2:
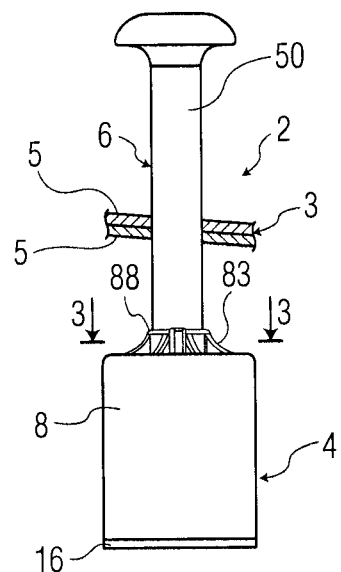
FIG. 2 is a side elevation view of the seal of FIG. 1.
Figure 3:
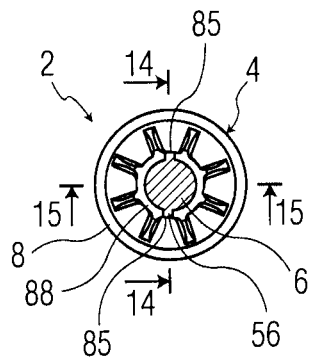
FIG. 3 is a cross section plan view of the seal of FIG. 2 taken along lines 3-3 of FIG. 2.
Figure 14:
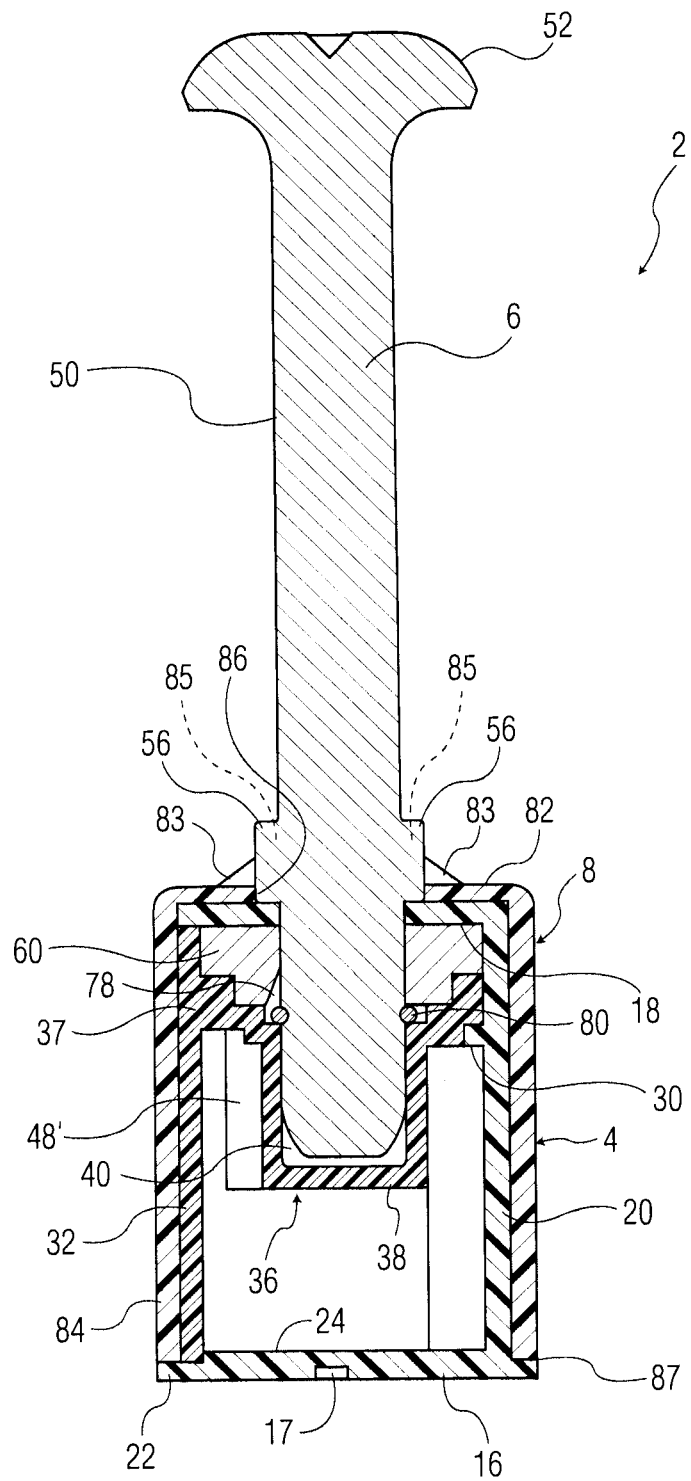
Figure 15:
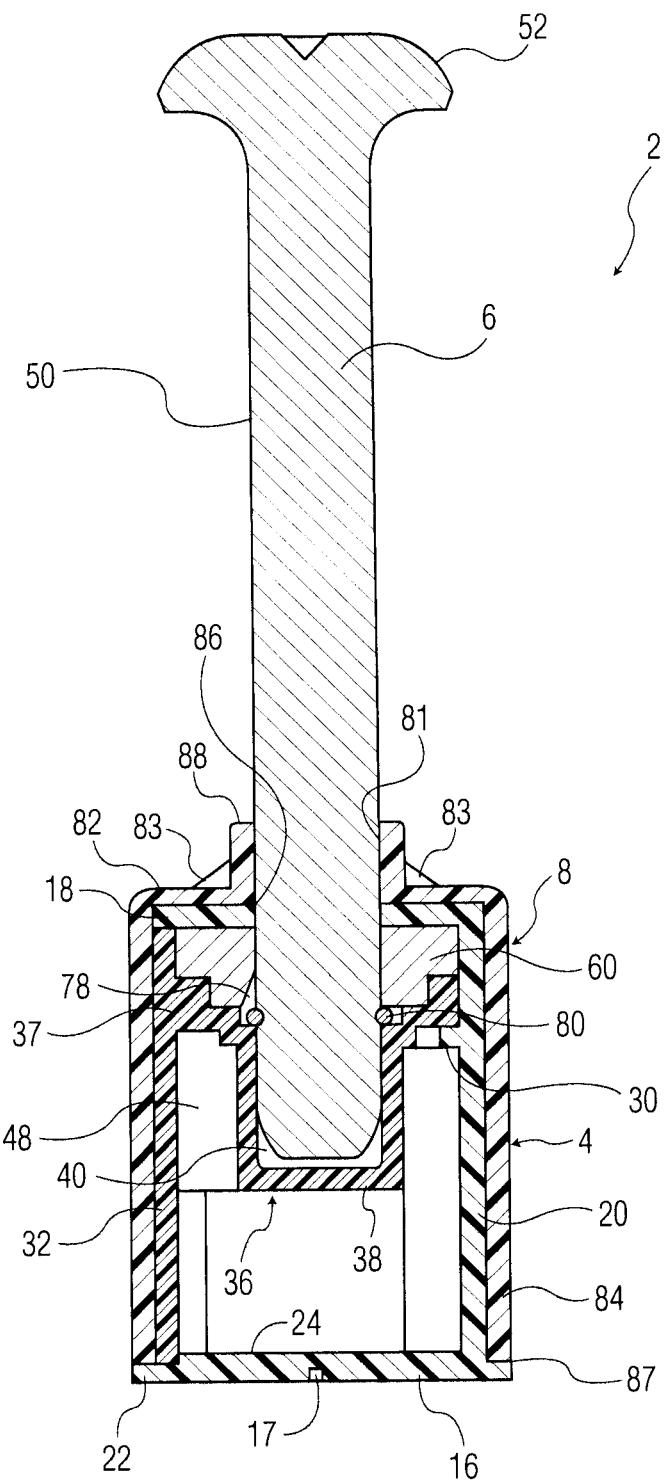

FIG. 14 is an elevation cross sectional view of the security seal of FIGS. 1, 2 and 3 taken at lines 14-14; and FIG. 15 is an elevation cross sectional view of the security seal of FIGS. 1, 2 and 3 taken at lines 15-15 of FIG. 3.

Seal 2, FIGS. 1-3, according to one embodiment of the present invention, comprises a locking unit 4 to which a bolt 6 is locked. In FIG. 2, a hasp 3 comprising, for example, two looped elements 5, attached to a door or the like, is secured by the locked seal 2. The locking unit 4 is described in connection with FIGS. 4-12, 14-15. The assembly of the locked bolt 6 to the locking unit 4 is illustrated in FIGS. 14 and 15.

In FIGS. 1-3, the locking unit 4 has a transparent circular cylindrical cover 8, preferably molded thermoplastic. The locking arrangement for locking the bolt 6 to the locking unit 4 is inside the cover 8.

Figure 4:
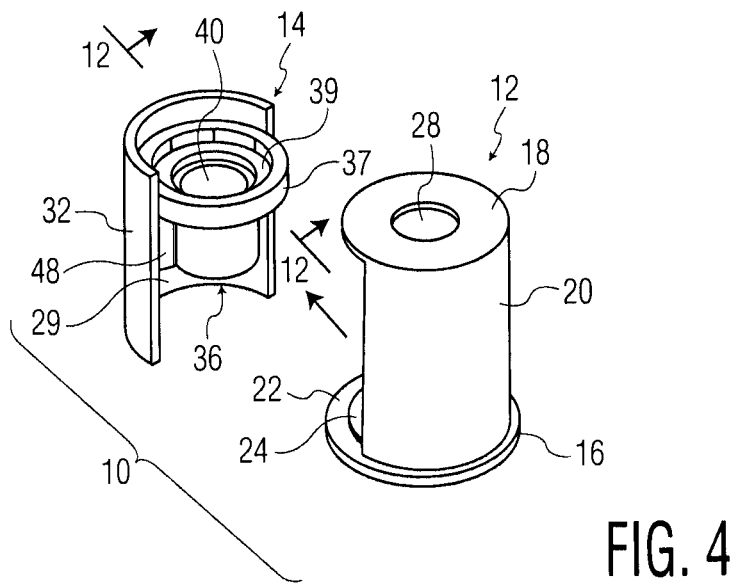
FIG. 4 is an isometric exploded view of two mating interior housing portions according to the embodiment of FIGS. 1 and 2 forming a unitary housing with the left hand housing portion including a first annular lock body portion extending cantilevered from and extending radially inwardly into the housing interior from the left hand housing portion.
Figure 5:
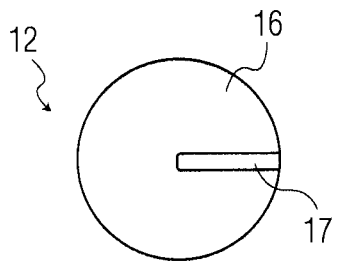
FIG. 5 is a bottom plan view of the right hand housing portion of FIG. 4 and taken along lines 5-5 of FIG. 6.
Figure 6:
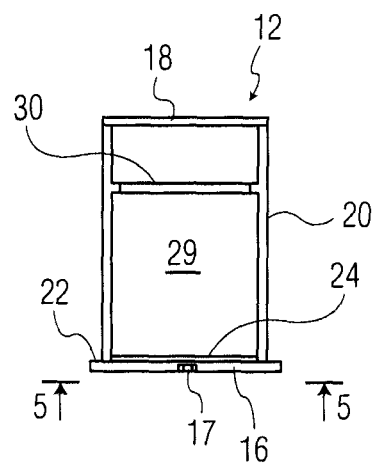
FIG. 6 is a side elevation view of the right hand housing portion of FIG. 4 showing a housing side opposite to that of FIG. 4.
Figure 7:
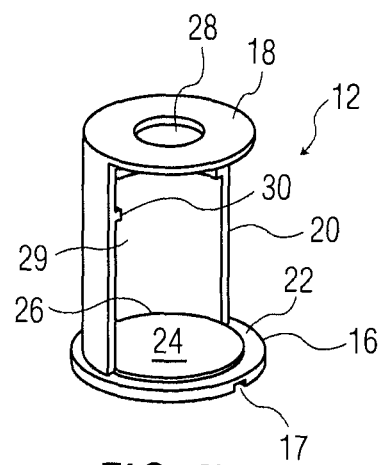
FIG. 7 is an isometric view of the right hand housing portion shown in FIG. 6.
Figure 8:
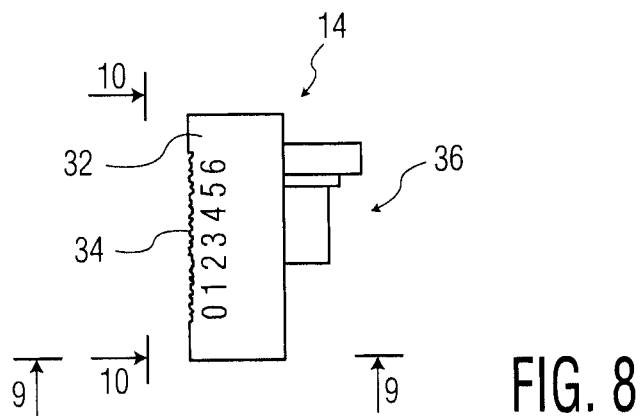
FIG. 8 is a side elevation view of the left hand housing portion of FIG. 4.
Figure 9:
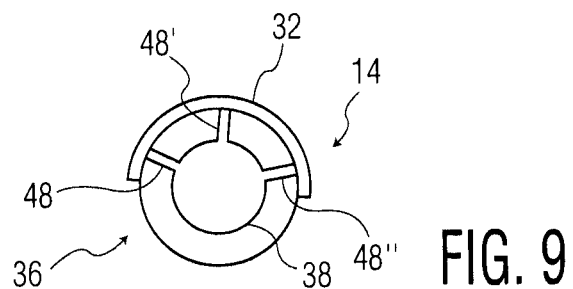
FIG. 9 is a bottom plan view of the housing portion of FIG. 8 taken along lines 9-9.

A preferably molded two piece thermoplastic housing 10, FIG. 4, is next adjacent to and is within the cover 8. The housing 10 has a first portion 14 that mates with a second portion 12 to form a circular cylindrical housing 10.

The housing 10 first portion 14, FIGS. 4, 8-10, includes a semicircular cylindrical segment first peripheral side wall 32. The outer surface of wall 32 is preferably laser imprinted with indicia 34, FIG. 10, comprising unique seal ID data such as a bar code, its number value and the name of the manufacturer, for example. This laser imprinting is unique because a laser printing process requires the imprinted surface to be in sharp focus at all times. Since only a line on the outer curved surface of wall 32 is in focus with a laser, the remaining surface will be out of focus and not be printable. However, in one embodiment (not shown) the laser is mounted on a fixture that rotates via a computer controlled platform about the outer curved surface of wall 32 that is fixed relative to that platform, keeping the laser beam in focus on the wall 32 outer surface at all times. To produce such a fixture is within the skill of those or ordinary skill. In the alternative, The laser may be fixed to a similar fixture and the housing portion 14 rotated relative to the laser to keep the laser beam focused on the outer surface of wall 32. The laser is computer controlled in a known manner.

The second housing portion 12, FIGS. 4-7, is molded one piece. Portion 12 has a planar circular disc-like bottom wall 16 and a planar washer-like top wall 18 interconnected by an intermediate semicircular cylindrical segment upstanding second peripheral side wall 20. The housing portion 12 is preferably colored and a different color than portion 14 described below. Portion 12 may be colored yellow, blue, red and so on, for example, or any other color as desired. Bottom wall 16 has an outer peripheral circular washer-like ledge 22 and a thicker central circular disc-like section 24 that forms a junction 26, FIG. 7, with the upstanding side wall 20. The top wall 18 has a central opening 28. The top wall 18, bottom wall 16 and side wall 20 form a hollow interior space 29 in the form of approximately one half a circular cylinder. A semicircular rib 30 extends radially inwardly from the inner surface of the side wall 20 into the hollow space 29. The bottom wall 16 has a channel 17 that is used to orient the housing portion 12 during manufacture of the seal locking unit 4.

The housing portion 14 includes a lock body first element 36 that is preferably molded thermoplastic one piece with the housing side wall 32. The housing portion 14 is preferably white, to provide sharp contrast with imprinted ID indicia 34 on sidewall 32, FIG. 10, but may be other colors according to a given implementation. Such other colors, if relatively dark, may provide reduced contrast for the indicia printed in black, or possibly in other colors as may be desired, and so are less desirable for these reasons on housing portion 14.

Figure 12:
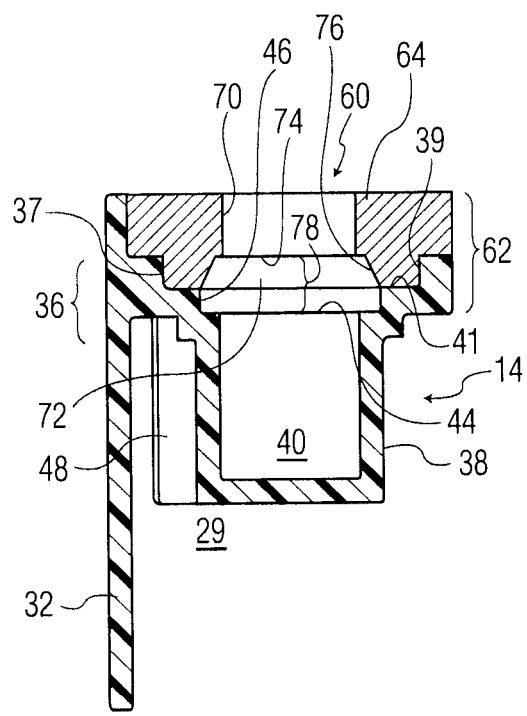

The lock body element 36, FIGS. 4 and 12, comprises a circular rim 37 having a central circular cylindrical recess 39 defined by a first shoulder 41. Located centrally of the recess 39 is a second shoulder 44 defining a central circular cylindrical first channel portion 46 of a locking ring receiving channel. The element 36 includes a central circular cylindrical body 38 that depends from the shoulder 44 region. The depending body 38 has a central circular cylindrical blind well-like bore 40 for receiving the shank locking portion 42 of the bolt 6, FIG. 13. The first element 36 extends cantilevered from the side wall 32 into the interior space 29 formed by wall 32, FIG. 4. Annularly spaced ribs 48, 48', 48", FIG. 9, further secure the body 38 to the side wall 32.

Figure 12A:
FIG. 12a is a plan view of a preferred embodiment of a resilient split ring used in the locking unit embodiment of the present invention.
Figures 12B, 13:
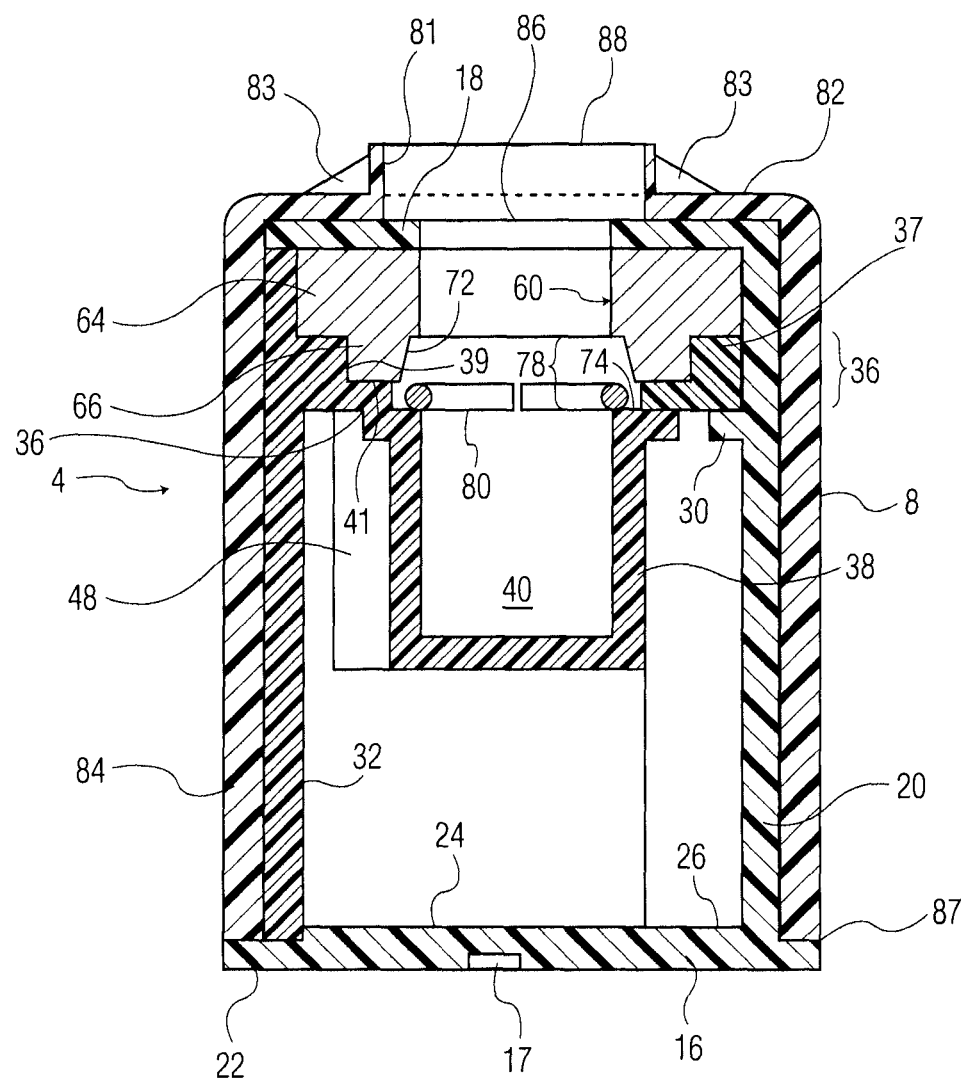
FIG. 12b is an elevation cross sectional view of the locking unit of the present invention.
FIG. 13 is an isometric side view of the bolt according to the embodiment of FIGS. 1, 2, 13 and 14.

In FIG. 13, the bolt 6 comprises a shank 50, a head 52 at one shank end and the locking portion 42 at the shank other end. The bolt preferably is one piece steel, but may be other materials and/or multiple pieces according to a given implementation. The shank has a tapered tip region 54. A pair of preferably identical rectangular planar tabs 56 extend radially from the shank on opposite sides thereof in mirror image relation. An annular groove 58 is in the shank surface at the shank locking portion 42.

Figure 11:
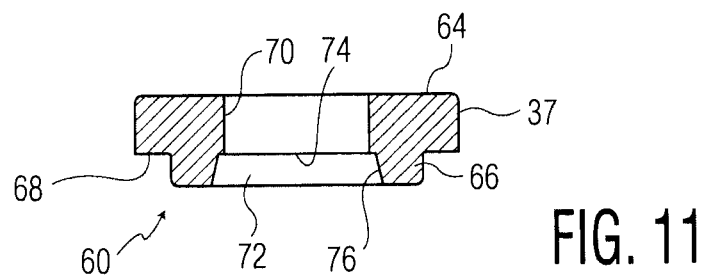
FIG. 11 is a cross sectional elevation view of one locking element of a locking body used in a locking unit embodiment of the present invention.
Figure 11A:
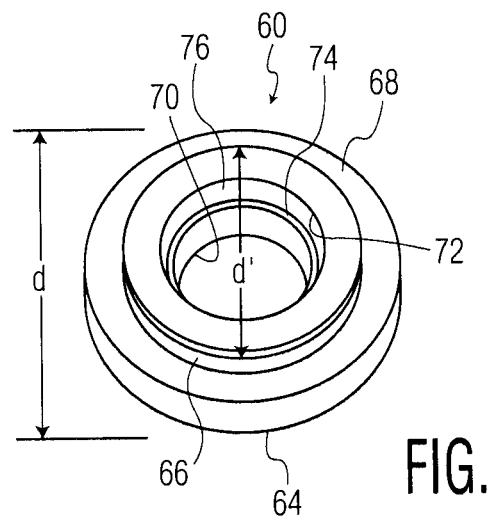
FIG. 11a is an isometric view of a stand alone second lock body portion of the locking body used in the locking unit embodiment of the present invention that mates with the first lock body portion of FIG. 4, which together form an annular lock body.

In FIG. 12, a lock body second element 60 mates with the first element 36 forming lock body 62. The element 60 is preferably steel in this embodiment, but could be other metals or other materials such as plastic according to a given implementation. The lock body second element 60, FIGS. 11, 11a, comprises a first circular cylindrical ring-like member 64 having a diameter d and a second cylindrical ring-like member 66 of a smaller diameter d' forming a shoulder 68. Element 60 has a central circular cylindrical bore 70. The bore 70 is in communication with a larger diameter annular channel portion 72. The bore 70 has a shoulder 74 that terminates at a tapering surface 76 that tapers to a diameter greater than that of the shoulder 74 forming a tapered channel portion 72. The channel portion 72 tapers to the same diameter as the channel portion 46 in the first lock body element 36, FIG. 12. The tapered channel portion 72 merges with the smaller diameter cylindrical channel portion 46 forming a single annular channel 78, FIG. 12.

A split resilient circular, preferably spring metal, ring 80, FIGS. 12a, 12b, is positioned in the channel 78 as shown in FIGS. 12b, 14 and 15. While a split ring 80 is shown in his embodiment, other types of springs as known in this art may also be used. The ring 80 has an inner diameter in its quiescent state that is smaller than the outer diameter of the shank 50 of the bolt 6, FIG. 13. The ring 80 can resiliently expand to a larger diameter when it encircles the shank during use of the seal 2.

Member 66 of the element 60, FIGS. 12 and 12b, is received in recess 39 of the element 60 abutting the shoulder 41 in nested relation. The shoulder 68, FIG. 11a, of member 64 abuts the rim 37. As shown in FIGS. 12b, 14 and 15, the element 60 abuts and is supported by rib 30 on side wall 20 in cooperation with the attachment of the element 60 to wall 32 from which element 60 is cantilevered.

In FIGS. 1, 2, 4, 12b, 14 and 15, the locking unit 4 includes a transparent, preferably molded thermoplastic, circular cylindrical cover 8 enclosing the locking body 62 and housing portions 12 and 14. The cover 8 has a washer-like top wall 82 with a central aperture 86, FIG. 12b. A circular cylindrical side wall 84 depends from the top wall 82. A circular cylindrical collar 88 extends upwardly from, and preferably molded plastic one piece with, the top wall 82 surrounding the aperture 86. The collar 88 has a central bore 81 in communication with the aperture 86 forming a through bore therewith for receiving the bolt locking portion 42 of the shank 50 (FIG. 13) at the shank tip region. A plurality of annularly spaced ribs 83 reinforce the collar at the junction of the collar 80 with the top wall 82 of the cover 8. The collar has two oppositely disposed slots 85 (FIG. 14) for receiving the tabs 56 of the received bolt 6.

The cover 8 is bonded at its lowermost bottom edge, for example sonic welded, to the bottom wall 16 at annular weld 87 which may be a sonic weld for the thermoplastic parts, FIGS. 12b, 14 and 15, to permanently secure the cover to and over the locking unit 4. In FIG. 12b, the split resilient locking ring 80 of the locking unit 4 is shown prior to insertion of the bolt into the locking unit. In this quiescent state of the ring 80, it loosely fits into the larger diameter of the cylindrical channel portion 46 of the lock body 62 (FIG. 12b). In this position the ring 80 can radially expand in response to the insertion of the bolt shank 50.

In operation, the bolt 6 shank locking portion 42, FIG. 13, is inserted into the locking unit 4, FIG. 12b, through the cover 8 collar 88 until the groove 58 of the shank 50 is aligned with the ring 80. This action expands the smaller diameter ring 80 in the larger cylindrical channel portion 46 (FIG. 12). When the groove 58 is aligned with the ring 80, the ring 80 resiliently retracts toward its smaller quiescent state within the bolt groove 58. When the bolt is retracted in the opposite withdrawal direction, the ring 80 abuts the tapered channel portion 78 forcing the ring 80 into the smaller diameter of the channel portion 78. In this position the ring is partially in the channel portion 78 and partially in the bolt groove 58, locking the bolt to the locking unit in a known manner.

Figure 10:
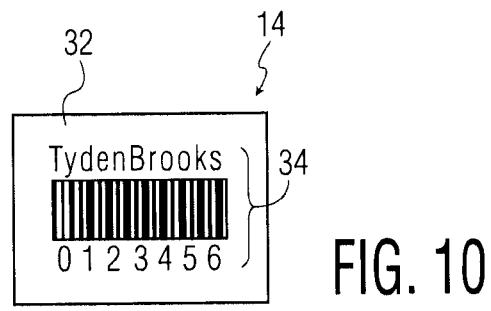
FIG. 10 is a side elevation view of the housing portion of FIG. 8 taken along lines 10-10 illustrating an ID laser bar code indicia imprinted on an arcuate surface.

The imprinted seal 2 ID 32, FIG. 10, is visible through the cover 8. Should a tampering attempt be made to open the seal by opening the weld 87, FIGS. 14, 15, to free the cover 8 from the inner locking unit components, the seal still can not be opened without permanently destroying the inner housing portions. This destruction leaves permanent evidence of tampering. The permanent destruction occurs because the top wall 18, FIG. 14, is locked in place by the locked bolt shank 50. The housing portion 12, FIG. 4, can not be removed from its locked position. The other housing portion 14, being captured by the housing portion 12 and to the locked bolt shank via the lock body element 36 molded one piece with housing portion 14, can not be removed from its locked position. Thus the lock body 62 is not accessible due to it being fully enclosed by the two housing portions 12 and 14, after the cover 8 is removed. The purpose of providing evidence of tampering provides deterrence from tampering by employees and others in privy to the locked sealed compartment.

The prior art, however, is not so constructed such that the removal of the cover exposes the previously covered lock body elements for easier removal by tampering. The cover then is reattached leaving little visual evidence of tampering. The present structure thus makes it more difficult to open the seal without leaving evidence of tampering since the housing portions will have to be permanently destroyed to gain access to the lock body 62.

Also, the tabs 56 on the bolt shank 50, FIG. 14, when engaged with the slots 85 on the collar 88 preclude spinning the bolt in an attempt to free it from the locking unit. The collar 88, if subject to high spin forces, will permanently fracture leaving tampering evidence.

Also, the lock body 62 is made of two elements, element 36, preferably plastic, and element 60, preferably steel or other hardened and/or tough material to break. Element 36 is used merely to permit the bolt to be inserted into the lock body. Once the bolt is inserted into the locking unit and locked thereto, the element 60 withstands the relatively high withdrawal forces exerted in the withdrawal direction by the ring 80. The ring 80 at this time is in the tapered channel portion 72 of the combined channel 78. The element 60, being steel and thus much stronger than the plastic element 36, provides additional protection from tampering by a withdrawal attempt on the bolt.

It will occur to those of ordinary skill that modifications may be made to the disclosed embodiments. For example, the disclosed bodies, the locking roller, the configuration and orientation of the various disclosed elements, their materials, dimensions, and overall configurations may differ from those disclosed herein. The various embodiments disclosed herein are given by way of illustration and not limitation. Such modifications are intended to be included in the scope of the present invention as defined by the appended claims.

What is claimed is:

1. A tamper evident bolt security seal comprising:
   a bolt comprising a shank having opposing ends, a head at one shank end and a locking groove in the shank surface at the other shank end forming a shank locking portion; and
   a locking unit to which the shank locking portion is secured;
   the locking unit comprising:
   first and second mating housing portions forming a housing defining an inner chamber;
   the first housing portion including a first peripheral side wall;
   the second housing portion including a second peripheral side wall having top and bottom regions, the second housing portion including a top wall and a bottom wall attached to the side wall respective top and bottom regions, the top wall having an aperture for receiving the shank therethrough;
   the first peripheral side wall being captured between the top and bottom walls and cooperating with the mating second housing portion for forming the inner chamber;
   a lock body secured to the first housing portion in the inner chamber and arranged for receiving the shank locking portion, the lock body having a locking channel adjacent to the received shank locking portion;
   a resilient element in the locking channel cooperating with the shank locking groove for locking the received shank to the lock body; and
   a cover arranged for the shank locking portion to pass therethrough for said locking and secured to the bottom wall, the cover and bottom wall for enclosing the first housing portion and the top and side wall of the second housing portion whereby the locked shank and lock body interlock the first and second housing portions thereto.

2. The security seal of claim 1 further including identification indicia on the outer surface of the first partial peripheral wall wherein at least a portion of the cover is sufficiently transparent for the indicia to be visible therethrough.

3. The security seal of claim 1 wherein the lock body comprises two mating elements, one of said lock body elements comprising a first material and one piece with the first housing portion and the other lock body element comprises a second material different than the first material.

4. The security seal of claim 3 wherein the first material is plastic and the second material is metal.

5. The security seal of claim 1 wherein the first and second housing portions are different colors, are circular cylindrical segments forming a cylindrical housing and are visible through the cover.

6. The security seal of claim 1 wherein the first and second housing portions are segments of a circular cylinder combining to form a circular cylinder.

7. The security seal of claim 1 wherein the cover is bonded to the bottom wall.

8. The security seal of claim 1 wherein the shank includes at least one projection extending radially outwardly from the shank surface, the cover including a top wall and a collar attached to the cover top wall, the collar and top wall arranged for permitting the shank to pass therethrough, the collar having a hollow portion for receiving the shank at least one projection for precluding rotation of the received locked shank relative to the locking unit.

9. The security seal of claim 8 including reinforcing ribs attached to the collar and top wall for reinforcing the collar, the hollow portion comprising a slot.

10. The security seal of claim 1 wherein the bottom wall has an outer ledge abutting the first housing portion, the cover abutting the ledge and being bonded thereto.

11. The security seal of claim 1 wherein the second housing portion side wall has a rib in the inner chamber for supporting the lock body.

12. The security seal of claim 1 wherein the lock body comprises two mating elements, one of said elements comprising a first material and one piece with the first housing portion and the other element comprises a second material different than the first material, the one element having a circular cylindrical recess of a given diameter forming a first portion of the channel and the other element having a recess in communication with the cylindrical recess and tapering from the given diameter to a smaller diameter wherein the recesses form an annular lock body channel.

13. The security seal of claim 12 wherein the lock body one element is plastic and the other lock body element is metal.

14. The security seal of claim 1 wherein the resilient element is a split C-shaped ring and the lock body channel is annular.

* * * * *